United States Patent
Schwinn (10) Patent No.: US 10,238,033 B2
(45) Date of Patent: Mar. 26, 2019

(54) REEL FINGER ASSEMBLY FOR A HARVESTING REEL

(71) Applicant: CNH Industrial America LLC, New Holland, PA (US)

(72) Inventor: Kevin Schwinn, Orion, IL (US)

(73) Assignee: CNH Industrial America LLC, New Holland, PA (US)

( * ) Notice: Subject to any disclaimer, the term of this patent is extended or adjusted under 35 U.S.C. 154(b) by 8 days.

(21) Appl. No.: 15/443,542

(22) Filed: Feb. 27, 2017

(65) Prior Publication Data

US 2018/0242525 A1 Aug. 30, 2018

(51) Int. Cl.
*A01D 57/00* (2006.01)
*A01D 57/02* (2006.01)
*A01D 57/03* (2006.01)

(52) U.S. Cl.
CPC ............. *A01D 57/02* (2013.01); *A01D 57/03* (2013.01)

(58) Field of Classification Search
CPC ..................................................... A01D 57/02
USPC ............................................................ 56/220
See application file for complete search history.

(56) References Cited

U.S. PATENT DOCUMENTS

| 670,662 | A |  | 3/1901 | Bransgrove |  |
|---|---|---|---|---|---|
| 2,811,008 | A |  | 10/1957 | Plant |  |
| 3,045,414 | A |  | 7/1962 | Scheidenhelm |  |
| 3,698,166 | A | * | 10/1972 | Fisher | A01D 57/02 56/220 |
| 3,751,888 | A |  | 8/1973 | James |  |
| 3,807,153 | A |  | 4/1974 | Barstroma et al. |  |
| 4,329,837 | A | * | 5/1982 | Vissers | A01D 78/1064 56/370 |
| 5,595,053 | A |  | 1/1997 | Jasper et al. |  |
| 6,098,389 | A | * | 8/2000 | Crunkelton | A01D 46/24 56/328.1 |
| 6,591,598 | B2 | * | 7/2003 | Remillard | A01D 57/03 56/221 |
| 6,843,045 | B2 |  | 1/2005 | Bickel |  |
| 7,131,253 | B2 | * | 11/2006 | Remillard | A01D 57/02 56/14.4 |
| 8,051,636 | B2 |  | 11/2011 | McClure et al. |  |
| 8,590,284 | B2 |  | 11/2013 | Rayfield |  |
| 9,526,209 | B2 | * | 12/2016 | Honey | A01D 57/12 |
| 9,622,413 | B2 | * | 4/2017 | Neely | A01D 45/021 |
| 2005/0132691 | A1 | * | 6/2005 | Mayer | A01G 20/30 56/344 |
| 2007/0289278 | A1 | * | 12/2007 | Coers | A01D 41/141 56/14.4 |
| 2009/0120049 | A1 | * | 5/2009 | Schumacher | A01D 57/02 56/227 |
| 2010/0175358 | A1 | * | 7/2010 | Van Den Engel | A01D 78/125 56/370 |

(Continued)

FOREIGN PATENT DOCUMENTS

| GB | 2172484 A | 9/1986 |
|---|---|---|
| WO | 2014021717 A1 | 2/2014 |

*Primary Examiner* — Thomas B Will
*Assistant Examiner* — Mai T Nguyen
(74) *Attorney, Agent, or Firm* — Peter K. Zacharias; Patrick M. Sheldrake (57) ABSTRACT

A split reel assembly for a header of a combine harvester is provided. The split reel has two reel assemblies driven by a central support assembly. A pivotable reel finger assembly is incorporated into a medial end of each reel assembly to deflect crop material away from the central support assembly.

15 Claims, 5 Drawing Sheets

(56) References Cited

U.S. PATENT DOCUMENTS

| | | | |
|---|---|---|---|
| 2012/0047867 A1* | 3/2012 | Coers | A01D 57/02 56/220 |
| 2014/0283494 A1 | 9/2014 | Schrattenecker | |
| 2015/0089916 A1 | 4/2015 | Schroeder et al. | |
| 2016/0066510 A1* | 3/2016 | Cook | A01D 57/02 56/222 |

* cited by examiner

REEL FINGER ASSEMBLY FOR A HARVESTING REEL

FIELD OF THE INVENTION

The present invention relates generally to a reel finger assembly for use with a harvesting split reel of agricultural harvesters. In particular, a reel finger is provided about a medial end of the split reels so as to deflect crop material, e.g., grain and material other than grain ("MOG") from collecting about a central support of the harvesting split reel.

BACKGROUND OF THE INVENTION

Harvesting reels, such as a pickup reel, a draper reel and a gathering reel, are used on agricultural machines to guide the crop to a cutting means as well as, if necessary, a feeding shaft. The reel is supported by a supporting pipe in the center of the reel, the longitudinal axis thereof forming the rotational axis of the reel. The reel includes a plurality of tine rods or bars extending transversely to the direction of travel with protruding tines for engaging the crop. The tine bars rotate with the supporting shaft of the reel. Individual tines are connected to the tine bars and extend generally outwardly and/or downwardly to engage crop material.

On a wider header, the harvesting reels are configured as two separate reels positioned side by side with a support arm between the reels. The support arm prevents mounting traditional fixed tines or fingers in the center of the reel (i.e., between the reels) resulting in crop feeding stagnation and crop wrapping. As a result, during use, there could be poor crop feeding between the reels and wrapping of material around the support arm.

BRIEF SUMMARY OF THE INVENTION

In accordance with an exemplary embodiment of the present invention, there is provided a harvesting reel for an agricultural harvester that includes a frame, a first reel assembly and a second reel assembly mounted to the frame in side by side relation and defining a gap therebetween, and a reel finger assembly pivotably connected to a medial side of at least one of the first and second reel assemblies. Each reel assembly includes a central rotating shaft, a plurality of support members extending widthwise across the reel assembly and connected to the central rotating shaft for rotation therewith, and a plurality of tines connected to each of the plurality of support members. The reel finger assembly includes an elongated finger having a proximal end pivotably coupled to the at least one of the first and second reel assemblies and moveable between a first position and a second position. The reel finger assembly further includes a biasing member biasing the elongated finger toward the first position, wherein a distal end of the elongated finger extends beyond the medial side of the at least one of the first and second reel assemblies.

In accordance with another exemplary embodiment of the present invention, there is provided a hingeable finger for a harvesting reel configured to improve feeding of crop into a combine harvester. Specifically, a reel finger is positioned on the end of a harvesting reel, that is, primarily at the center of the header where split reels are supported by a support arm. The reel finger includes two pieces connected, e.g., by a pin that allows rotation. A lower portion of the finger is normally positioned in a void between two reels but pivots when contacted by the support arm. Once clear of the support arm, the lower portion swings back into an operating position. A torsion spring or leaf spring can be used to hold the finger in the operating position.

The resultant advantages of the exemplary embodiments of the present invention include lower grain loss, adding grain saving value to a harvesting reel, and saving time spent cleaning debris out of a central support assembly. Such a reel finger assembly in accordance with an exemplary embodiment of the present invention improves crop feeding during harvesting operations.

BRIEF DESCRIPTION OF THE SEVERAL VIEWS OF THE DRAWINGS

The foregoing summary, as well as the following detailed description of the exemplary embodiments of the invention, will be better understood when read in conjunction with the appended drawings. For the purpose of illustrating the invention, there are shown in the drawings embodiments, which are presently preferred. It should be understood, however, that the invention is not limited to the precise arrangements and instrumentalities shown.

In the drawings.

DETAILED DESCRIPTION OF THE INVENTION

Reference will now be made in detail to the various aspects of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the present invention in any manner not explicitly set forth.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

The terms "corn," "ear," "stalk," "leaf," and "crop material" are used throughout the specification for convenience and it should be understood that these terms are not intended to be limiting. Thus, "corn" or "grain" refers to that part of a crop which is harvested and separated from discardable portions of the crop material. The header of the present invention is applicable to a variety of crops, including but not limited to wheat, barley, soybeans and other small grains. The terms "debris," "material other than grain," and the like are used interchangeably.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the embodiments of the present invention may be combined in any suitable manner in one or more embodiments. One skilled in the relevant art will recognize, in light of the description herein, that the present invention can be practiced without one or more of the specific features or advantages of a particular embodiment. In other instances, additional features and advantages may be recognized in certain embodiments that may not be present in all embodiments of the present invention.

Figure 1:
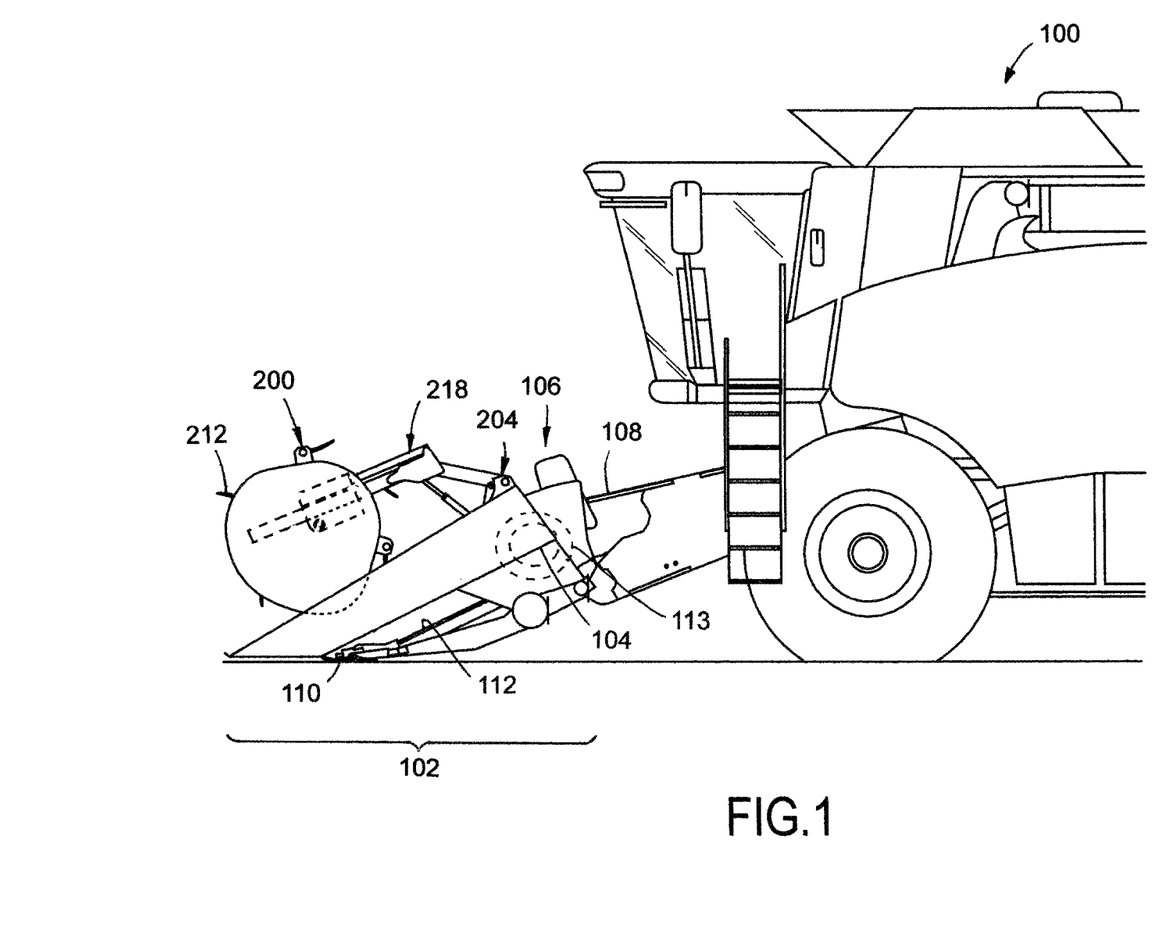
FIG. 1 is a side view of a harvester in accordance with an exemplary embodiment of the present invention.

Referring now to the drawings wherein exemplary embodiments of the present invention are shown, FIG. 1 illustrates an agricultural harvester 100 in accordance with an exemplary embodiment of the present invention. The agricultural harvester e.g., a combine harvester 100, includes a header 102 having a chassis or frame 104 which is attached to a forward end 106 of the harvester, e.g. via a feeder house 108. The header 102 is configured to cut crops with a cutting apparatus 110 as the harvester 100 moves forward over a crop field, and includes a reel 200 for moving crop materials rearwardly. Below and/or rearwardly of the reel 200, the header 102 may further include a draper belt 112 and/or an auger 113 for moving crop materials medially and rearwardly after cutting so as to feed the crop material to the harvester 100 through the feeder house 108.

Figure 2:
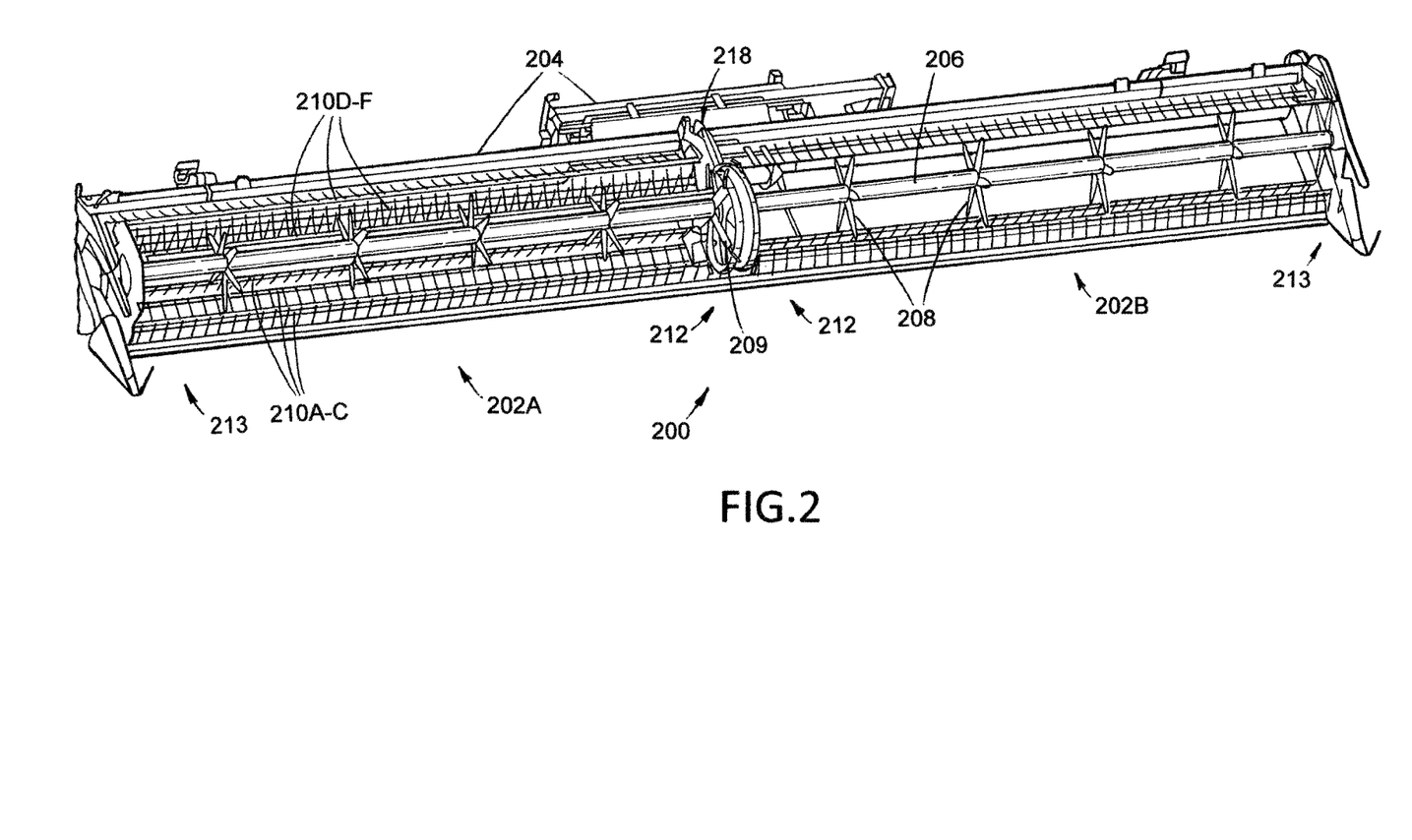
FIG. 2 is a front perspective view of a reel assembly of the harvester of FIG. 1 in accordance with an exemplary embodiment of the present invention.

As best shown in FIG. 2, the reel 200, also known as a split reel, spans laterally and widthwise from the header and includes first and second reel assemblies 202A, 202B. The first and second reel assemblies 202A, 202B are mounted to a frame 204 of the header 102 and arranged in a side by side or end-to-end manner at about a midpoint of the header. The first and second reel assemblies 202A, 202B are substantially similar and mirror images of each other, and as such only one reel assembly 202A will be described in detail.

Figure 3:
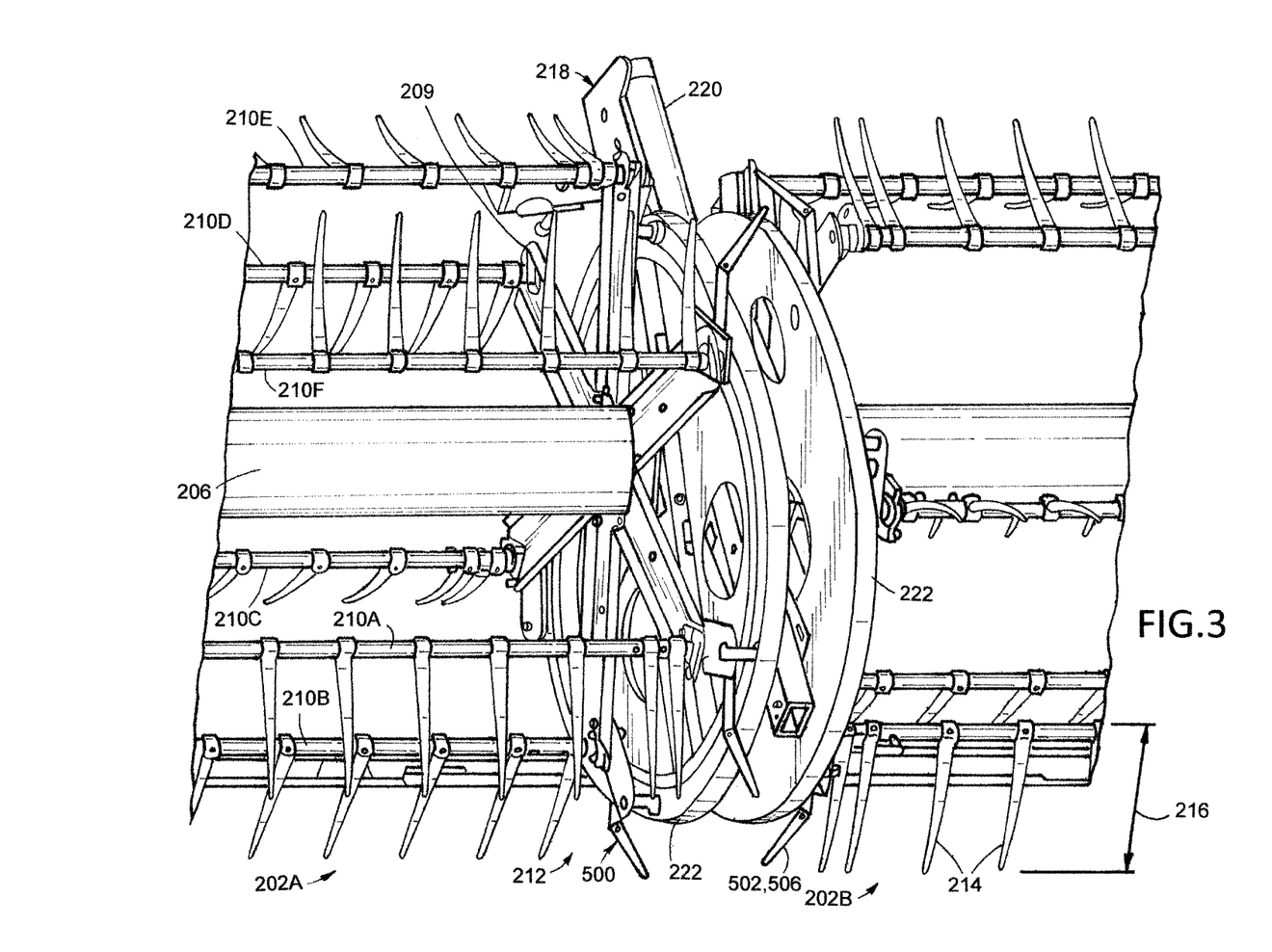
FIG. 3 is a partial front perspective view of the reel assembly of FIG. 2.

Referring to FIGS. 2 and 3, the first reel assembly 202A includes a central rotating shaft 206, supporting brackets 208 including a medial end bracket 209, and support members 210A-F mounted to distal portions of the supporting brackets and end bracket. The central rotating shaft 206 is powered by the header 102, as is known in the art.

The support members or rods 210A-F extend substantially parallel to the central rotating shaft 206 and are circumferentially spaced about the central rotating shaft. Each support member 210A-F extends from a medial end 212 to a lateral end 213 of the central rotating shaft 206. Although six support members 210A-F are illustrated, more or fewer may be provided.

Each support member 210A-F includes a plurality of tines 214 for gathering and directing crop downwardly and rearwardly into the header 102 for subsequent cutting and harvesting operations. The tines are elongated, having a longitudinal length 216.

Figure 4:
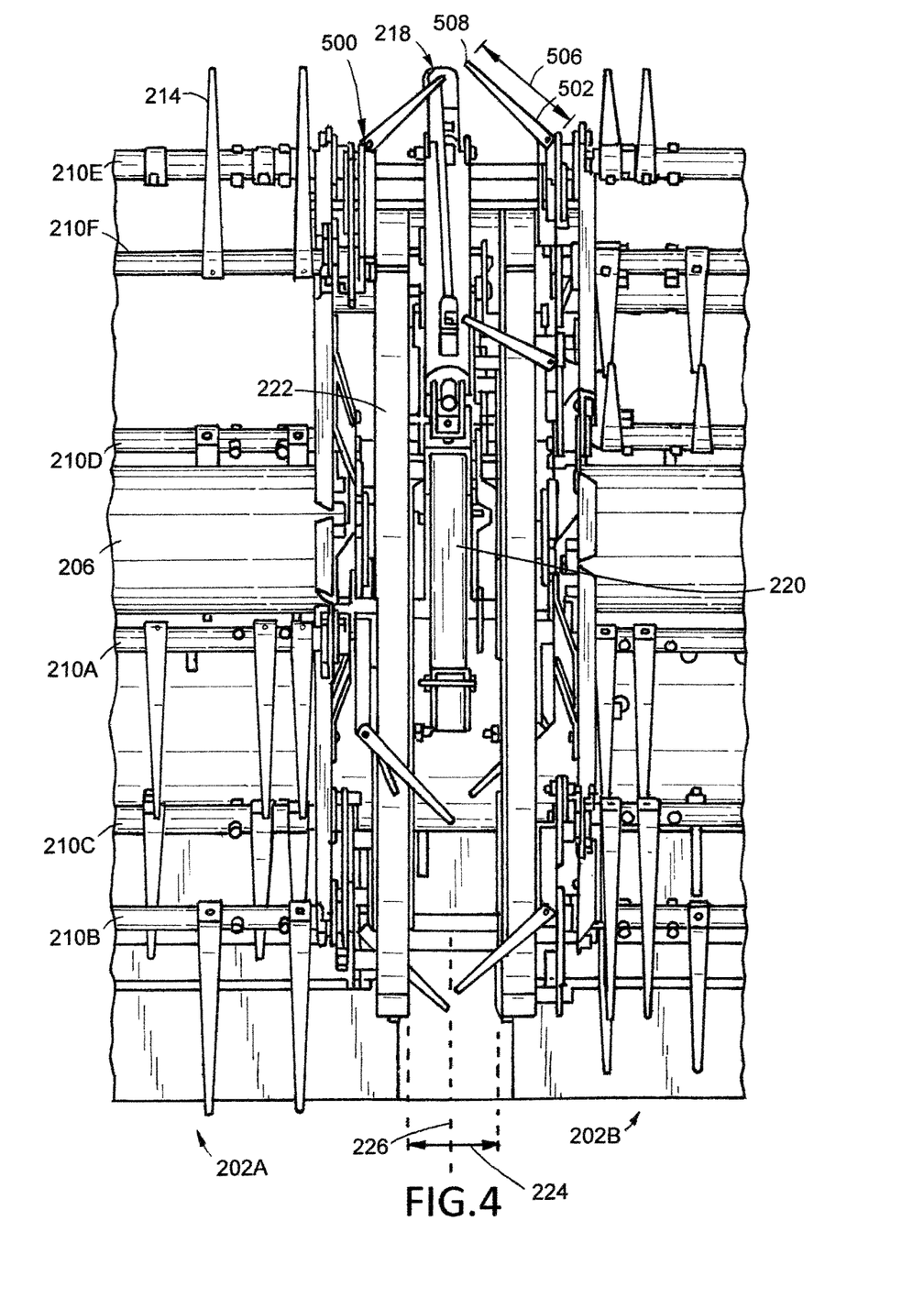
FIG. 4 is a partial top plan view of the reel assembly of FIG. 2.

As shown in FIGS. 3 and 4, at a medial end 212 of the first reel assembly 202A there is provided a central support assembly 218 including a central support arm 220 for mounting the reel assemblies to the frame 204. The reel assembly 202A has the end bracket 209 and a support plate 222 positioned about the central support assembly 218. The support plates 222 of the first and second reel assemblies 202A, 202B define a gap 224 therebetween. In other words, the harvesting reel 200 has a pair of support plates 222, each support plate positioned about a medial end 212 of a respective central rotating shaft 206.

The central support arm 220 of the central support assembly 218 supports the reel 200. In other words, the central support arm 220 extends into the gap 224 and is connected to both the first and second reel assemblies 202A, 202B to raise and lower the first and second reel assemblies.

Figure 5:
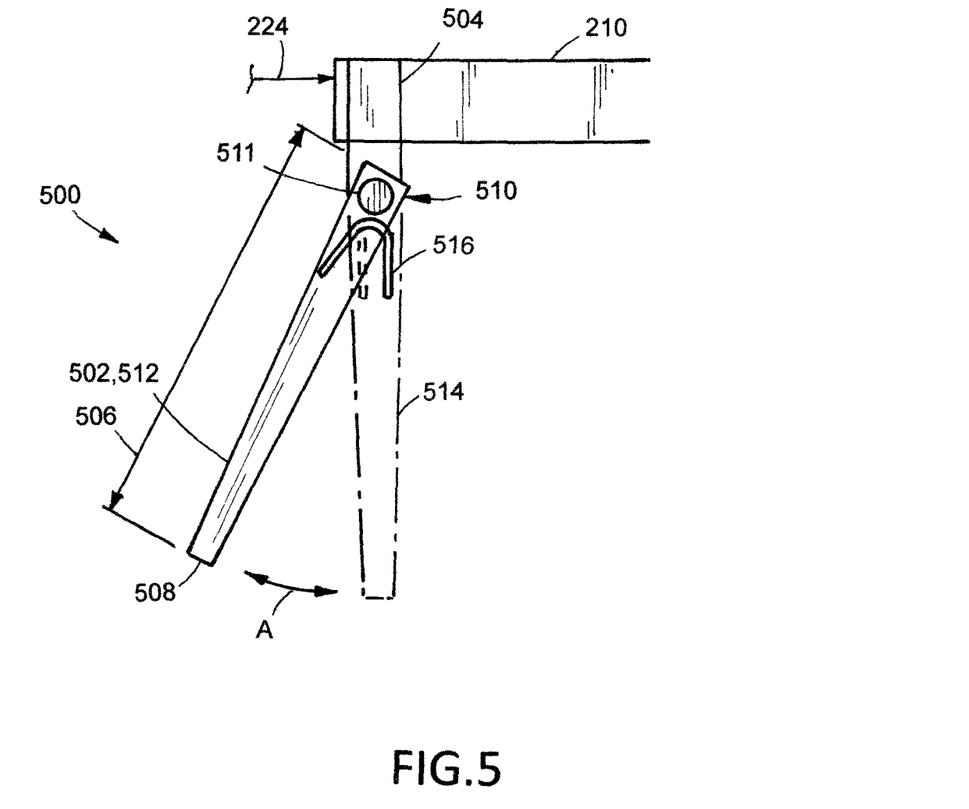
FIG. 5 is a partial front elevation view of a finger of the reel assembly of FIG. 2 in accordance with another exemplary embodiment of the present invention.

As shown in FIGS. 4 and 5, the medial end 212 of the first reel assembly 202A is provided with a plurality of reel finger assemblies 500 each including a finger 502 and a biasing member 516.

The finger 502 is an elongated finger and sized with a longitudinal length 506 and positioned such that a distal end 508 of the finger extends beyond the medial side 212 (FIG. 4) of the first reel assembly 202A and over or within the gap 224. More preferably the finger 502 extends to about a centerline 226 of the gap 224, and most preferably extends beyond the centerline. The finger 502 is illustrated in the exemplary embodiment as a tapering linear shape, but may be provided as various shapes including linear, curved, bent, cylindrical, conical, combinations thereof, or the like.

For attachment to the reel 200, the finger 502 is resiliently mounted to a mounting bracket 504. In an exemplary embodiment shown in FIG. 5, the mounting bracket 504 is mounted to one of the support members 210. A pivot joint 510 connects the finger 502 to the mounting bracket 504. In an exemplary embodiment, the pivot joint 510 is one of a pin joint with a pivot pin 511, a hinge, or the like. In other words, the reel finger assembly 500 is pivotably connected to the at least one of the first and second reel assemblies 202A, 202B by the pivot pin 511.

The pivot joint 510 allows the finger 502 to move, as indicated by arrow A, between an extended position 512 (also referred to as an operating position or first position) and a retracted position 514 (shown in relief). An angle defined between the extended position 512 and the retracted position 514 may be about 15 degrees to about 75 degrees, more preferably about 30 degrees to about 60 degrees, and most preferably about 45 degrees. Alternatively expressed, referring to FIG. 4, the finger 502 can move between about 90 degrees to about 175 degrees relative to a longitudinal axis of the support member 210A-F, extending medially of the support member, when moving between the extended position 512 and the retracted position 514. The finger 502 can also move medially within the range of about 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, and 170 degrees when moving between the extended position 512 and the retracted position 512.

Referring again to FIG. 5, a biasing member 516 is mounted to each of the fingers 502 and the respective mounting brackets 504 so as to resiliently bias the finger toward the extended position 510. As such, the finger 502 may be retracted to an intermediate position between the extended 512 and retracted 514 positions. In other words, the finger 502 is moveable between a plurality of positions. The biasing member 516 illustrated is a spring, however, other biasing members are contemplated, including elastomeric members, elastomeric bushings, leaf springs, torsion springs, compression springs, or the like.

Various arrangements and modifications to the reel finger assemblies 500 may be provided. The mounting bracket 504 may be mounted to the end bracket 209 or to the support members 210A-F, directly or indirectly. Thus the reel finger assemblies 500 may be pivotably coupled or connected to one of the end brackets 209 or to the plurality of support members 210A-F. In this manner, the mounting bracket 504 is connected to one of the first and second reel assemblies 202A, 202B and the elongated finger 502.

As shown in FIG. 3, the length 506 of the fingers 502 can be less than the length 216 of the tines 214, however the fingers may alternatively have an equal or greater length than the tines 214. In alternative embodiments, the finger 502 may be formed of multiple segments, and the pivot joint 512 and biasing member 516 may be positioned between segments of the finger while a proximal segment of the finger is rigidly mounted to the mounting bracket 504.

During use, the reel assembles 202A, 202B rotate so that the tines 214 engage a crop and direct it downwardly toward the cutting apparatus 110 and rearwardly along the header 102. Similarly, the fingers 502 engage a crop and direct it downwardly toward the cutting apparatus 110 and rearwardly along the header 102.

As the reel assembly 202A rotates, the fingers 502 are in the extended position 512 and the distal ends 508 extend into (in other words, over or within) the gap 224 so as to direct crop material and MOG away from the central support assembly 218, thus preventing a buildup of debris about the central support assembly and central support arm 220. Specifically, the fingers 502 urge the crop material and MOG downwardly toward the cutting apparatus 110 and/or laterally (i.e., outwardly) toward the support members 210A-F and tines 214.

As the reel assembly 202A continues to rotate, each finger 502 sequentially reaches the central support assembly 218, and rotation of the reel causes the central support arm 220 to contact the finger and oppose the biasing member 516. Consequently, the finger 502 retracts to a second position (i.e., the intermediate position or the retracted position 514) as it passes along the central support assembly 218. In other words, upon rotation of at least one of the first and second reel assemblies 202A, 202B, the elongated finger 502 engages the central support arm 220 to move the elongated finger to the second position. In this manner, the elongated finger 502 continues to urge crop material toward the cutting apparatus 110 while the elongated finger passes along the central support arm 220.

As such during use, the first position 512 of the finger 502 is an operating position for transport of crop material toward the cutting apparatus 110 and thereafter from the cutting apparatus 110 to the draper belt 112 or the auger 113. The second position (i.e., the intermediate position or the retracted position 514) is for allowing rotation of the first and second reel assemblies 202A, 202B past the central support arm 220 of the harvesting reel 200.

While the finger 502 is in the intermediate position or the retracted position 514, the biasing member 516 presses the finger 502 against the central support arm 220, such that crop material and MOG cannot pass between the finger 502 and the central support arm 220. Thereafter, once the finger 502 rotates past the central support assembly 218, the biasing member 516 biases the finger to return to the extended position 512.

Consequently, the reel finger assembly 500 prevents crop material from stagnating on the cutting apparatus 110 and from eventually hindering the cutting apparatus. Moreover, the reel finger assembly 500 prevents cut crop material or MOG from collecting on the central support assembly 218 and its central support arm 220.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

I claim:

1. A harvesting reel for an agricultural harvester comprising:
   a frame;
   a first reel assembly and a second reel assembly mounted to the frame in side by side relation and defining a gap therebetween, each reel assembly including:
      a central rotating shaft,
      a plurality of support members extending widthwise across the reel assembly and connected to the central rotating shaft for rotation therewith, and
      a plurality of tines connected to each of the plurality of support members; and
   a reel finger assembly pivotably connected to a medial side of one of the first and second reel assemblies, the reel finger assembly including:
      an elongated finger having a proximal end pivotably coupled to the at least one of the first and second reel assemblies and moveable between a first position and a second position, and
      a biasing member biasing the elongated finger toward the first position, wherein a distal end of the elongated finger extends beyond the medial side of the at least one of the first and second reel assemblies.

2. The harvesting reel of claim 1, further comprising a pair of support plates, each support plate positioned about a medial end of a respective central rotating shaft.

3. The harvesting reel of claim 1, wherein each reel assembly further includes end brackets connecting the plurality of support members to the central rotating shaft, and wherein the reel finger assembly is pivotably coupled to the end bracket.

4. The harvesting reel of claim 1, wherein the reel finger assembly is pivotably coupled to one of the plurality of support members.

5. The harvesting reel of claim 1, further comprising a central support arm extending from the frame into the gap and connected to the first and second reel assemblies to raise and lower the first and second reel assemblies.

6. The harvesting reel of claim 5, wherein the first position is an operating position for prohibiting crop material from entering the gap, and the second position is a retracted position for allowing rotation of the at least one of the first and second reel assemblies past the central support arm of the harvesting reel.

7. The harvesting reel of claim 5, wherein upon rotation of the at least one of the first and second reel assemblies, the elongated finger engages the central support arm to move the elongated finger to the second position.

8. The harvesting reel of claim 5, wherein upon rotation of the at least one of the first and second reel assemblies, the elongated finger extends over the gap.

9. The harvesting reel of claim 5, wherein upon rotation of the at least one of the first and second reel assemblies, a distal end of the elongated finger extends within the gap.

10. The harvesting reel of claim 1, wherein the elongated finger is linear, curved or bent.

11. The harvesting reel of claim 1, wherein the elongated finger is moveable between a plurality of positions.

12. The harvesting reel of claim 1, wherein the reel finger assembly is pivotably connected to the at least one of the first and second reel assemblies by a pivot pin.

13. The harvesting reel of claim 1, wherein the reel finger assembly further includes a mounting bracket connected to the at least one of the first and second reel assemblies and the elongated finger.

14. The harvesting reel of claim 1, wherein the elongated finger is a tine-shaped elongated finger.

15. The harvesting reel of claim 1, wherein the reel finger assembly is pivotably connected to an inner side of the medial side of one of the first and second reel assemblies.

\* \* \* \* \*